(12) United States Patent
Scrivano (10) Patent No.: US 10,931,746 B2
(45) Date of Patent: Feb. 23, 2021

(54) MANAGING CONTENT DOWNLOADS (71) Applicant: Red Hat, Inc., Raleigh, NC (US)

(72) Inventor: Giuseppe Scrivano, Spezzano della Sila (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/735,199

(22) Filed: Jan. 6, 2020

(65) Prior Publication Data
US 2020/0145479 A1 May 7, 2020

Related U.S. Application Data (63) Continuation of application No. 15/497,570, filed on Apr. 26, 2017, now Pat. No. 10,554,743.

(51) Int. Cl.
*H04L 29/08* (2006.01)
*H04L 29/06* (2006.01)

(52) U.S. Cl.
CPC .......... *H04L 67/104* (2013.01); *H04L 63/083* (2013.01); *H04L 67/02* (2013.01); *H04L 67/06* (2013.01); *H04L 67/1063* (2013.01); *H04L 67/2842* (2013.01); *H04L 67/34* (2013.01)

(58) Field of Classification Search
CPC ....... H04L 63/083; H04L 67/02; H04L 67/06; H04L 67/104; H04L 67/1063; H04L 67/2842; H04L 67/34
See application file for complete search history.

(56) References Cited

U.S. PATENT DOCUMENTS

| | | | | |
|---|---|---|---|---|
| 6,321,336 B1 * | 11/2001 | Applegate | ............... | H04L 63/02 709/220 |
| 7,346,044 B1 * | 3/2008 | Chou | ...................... | H04L 12/66 370/352 |
| 7,417,978 B1 * | 8/2008 | Chou | ...................... | H04L 45/00 370/352 |

(Continued)

FOREIGN PATENT DOCUMENTS

EP 2525544 A1 11/2012

OTHER PUBLICATIONS

Dessent, [*Bittorrent*] *When users are Behind a Transparent Proxy, it is Possible to Trace their Real IP Address?*, Mar. 17, 2006, http://lists.ibiblio.org/pipermail/bittorrent/2006-March/001798.html.

(Continued)

*Primary Examiner* — Michael C Lai
(74) *Attorney, Agent, or Firm* — Kilpatrick Townsend & Stockton LLP (57) ABSTRACT

Content downloads can be managed. For example, intermediary software can receive a first request to download content from a remote server. The intermediary software can receive the first request from content requesting software. The first request can be formed according to a first protocol. The intermediary software can intercept the first request to prevent the first request from being communicated to the remote server. The intermediary software can generate a second request based on the first request and according to a second protocol that is different from the first protocol and that is usable with a peer-to-peer network. The intermediary software can then transmit the second request to the peer-to-peer network to cause the content to be downloaded from the peer-to-peer network.

20 Claims, 4 Drawing Sheets

(56) References Cited

U.S. PATENT DOCUMENTS

| | | | |
|---|---|---|---|
| 7,920,572 B2* | 4/2011 | Bates | H04L 45/02 370/392 |
| 7,957,280 B2 | 6/2011 | Cohen et al. | |
| 9,374,395 B2 | 6/2016 | Barton et al. | |
| 9,846,900 B2* | 12/2017 | Ahmed | G06Q 30/06 |
| 2006/0212542 A1* | 9/2006 | Fang | H04L 67/104 709/219 |
| 2007/0174471 A1* | 7/2007 | Van Rossum | H04N 21/4532 709/229 |
| 2008/0016201 A1* | 1/2008 | Thompson | H04L 67/1002 709/223 |
| 2008/0279178 A1* | 11/2008 | Chou | H04L 45/00 370/352 |
| 2009/0265414 A1* | 10/2009 | Bryan | H04L 67/104 709/202 |
| 2009/0316687 A1* | 12/2009 | Kruppa | H04L 67/1065 370/352 |
| 2010/0049864 A1* | 2/2010 | Lu | H04N 21/23436 709/231 |
| 2011/0167165 A1* | 7/2011 | Bryan | H04L 67/104 709/230 |
| 2011/0238828 A1* | 9/2011 | Grigsby | H04L 67/1085 709/224 |
| 2012/0079029 A1* | 3/2012 | Damola | H04L 67/2842 709/204 |
| 2014/0040353 A1 | 2/2014 | Sebastian et al. | |
| 2016/0088022 A1* | 3/2016 | Handa | H04L 63/105 726/1 |
| 2016/0105342 A1* | 4/2016 | Hockett | H04L 43/02 709/224 |
| 2016/0173567 A1* | 6/2016 | Liang | H04L 67/06 709/219 |

OTHER PUBLICATIONS

Klimek, *P2P Proxy/Cache*, Computer Networks Laboratory, Department of Computers and Informatics, Technical University of Kosice, Letna 9, 041 20 Kosice, Slovak Republic, http://stargate/cnl/tuke/sk/~klimek/P2P_proxy_cache_projekt.pdf.

How to Use Qbittorrent Anonymously, http://www.best-bittorrent-vpn.com/how-to-use-qbittorrent-anonymously.html.

Operating System and Container Binary Deployment and Upgrades, https://github.com/ostreetdev/ostree.

* cited by examiner

MANAGING CONTENT DOWNLOADS

REFERENCE TO RELATED APPLICATION

This is a continuation of co-pending U.S. patent application Ser. No. 15/497,570, titled "Managing Content Downloads" and filed on Apr. 26, 2017, and issued as U.S. Pat. No. 10,554,743, the entirety of which is hereby incorporated by reference herein.

TECHNICAL FIELD

The present disclosure relates generally to multicomputer data transferring. More specifically, but not by way of limitation, this disclosure relates to a managing content downloads.

BACKGROUND

A network can include multiple nodes in communication with one another for managing and processing information. Examples of a node can include a computing device, a server, a virtual machine, or any combination of these. The nodes may have software for performing various operations. Over time, software updates may become available for the software on the nodes. Typically, all of the nodes in the network will download the software updates from a single, central server.

DETAILED DESCRIPTION

There can be disadvantages to having a network of nodes download content (e.g., software updates, files, etc.) from a single, central server. For example, the central server can have limits on the number of connections and data requests that the central server can handle at any given time. When too many nodes attempt to download content from the central server at the same time, the central server becomes overloaded. This can result in delays, errors, interruptions, and other problems with the downloads. And it may be infeasible to reprogram the nodes to download the content from other sources (e.g., because there are dozens or hundreds of nodes, the software for downloading content is unmodifiable, or both).

Some examples of the present disclosure may overcome one or more of the abovementioned issues by intercepting download requests for content that are directed to a central server, redirecting the download requests to a peer-to-peer network from which the content can be obtained, and downloading the content from the peer-to-peer network. A peer-to-peer network can include a distributed network of peers (nodes) that share resources among each other without the use of a centralized server. By redirecting download requests to the peer-to-peer network, the problems associated with overloading a central server can be reduced or eliminated.

As a particular example, each node in a network can execute content requesting software and intermediary software. The content requesting software can transmit a download request for downloading content from a central server. The intermediary software can intercept the download request and determine if the content is available on a peer-to-peer network, such as a BitTorrent network by BitTorrent™. If so, the intermediary software can redirect the download request to the peer-to-peer network to cause the content to be downloaded from the peer-to-peer network. Otherwise, the intermediary software can transmit the download request to the central server to cause the content to be downloaded from the central server. Some examples of the present disclosure can provide load balancing by distributing network traffic associated with content downloads among peers in a peer-to-peer network, rather than directing all of the network traffic to a single, central server.

In some examples, the peer-to-peer network communicates using a different protocol than the content requesting software. For example, the content requesting software may transmit the download request according to a Hypertext Transfer Protocol (HTTP), but the peer-to-peer network may communicate using a BitTorrent protocol by BitTorrent™. In some examples, the intermediary software can account for this protocol difference by translating, transforming, or otherwise modifying the download request into another format used by the peer-to-peer network. Alternatively, the intermediary software can generate a new download request in the format used by the peer-to-peer network based on the original download request.

In some examples, the intermediary software is transparent to the content requesting software. For example, the intermediary software may execute in a background process and may not influence the functionality of the content requesting software. And the content requesting software may be unaware that its download requests are being intercepted, redirected, or both by the intermediary software. The content requesting software may also be unaware that the content it is receiving is from the peer-to-peer network, rather than the remote server.

In some examples, different pieces of content requesting software on a node can share the same intermediary software, reducing or eliminating the need to install or configure multiple pieces of intermediary software on the node.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
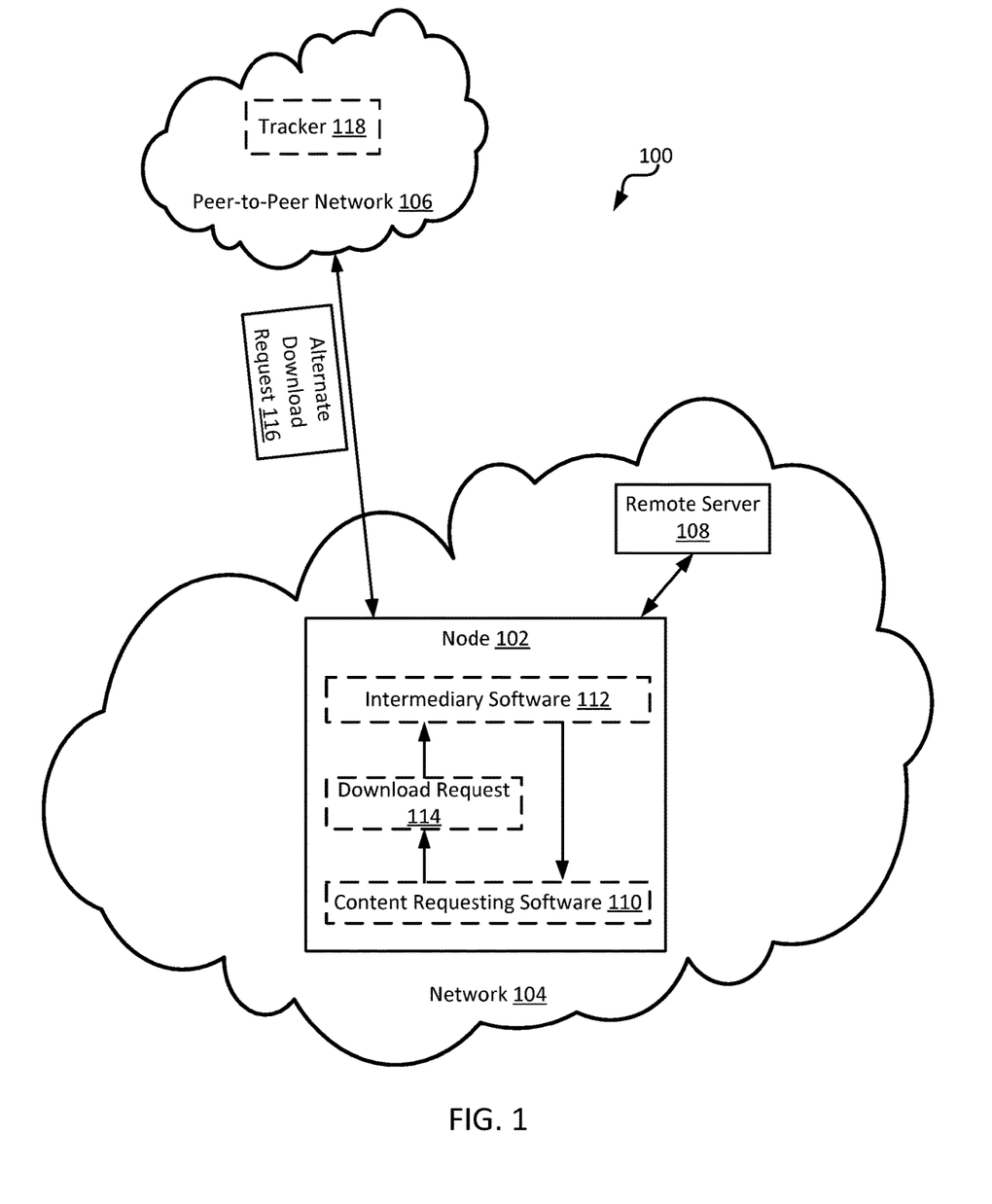
FIG. 1 is a block diagram of an example of a system for managing content downloads according to some aspects.

FIG. 1 is a block diagram of an example of a system 100 for managing content downloads according to some aspects. The system 100 includes a network 104. Examples of the network 104 can include a local area network (LAN), such as one or more local networks of a datacenter; a wide area network (WAN); the Internet; or any combination of these.

The network 104 includes node 102. Although only one node 102 is shown in this figure for simplicity, the network 104 can have any number (e.g., dozens or hundreds) and combination of nodes. And some or all of the nodes may be configured similarly to node 102. The network 104 can also include a remote server 108 for transmitting content to the node(s).

The node 102 includes content requesting software 110. The content requesting software 110 is software that can request content from the remote server 108. Examples of the content requesting software 110 can include container management software, such as Docker™, for creating or launching containers within a host environment; filesystem management software, such as OSTree™, for managing filesystem trees (e.g., bootable versioned filesystem trees); operating-system management software for managing updates to an operating system; content streaming software for streaming video, audio, or multimedia content; or any combination of these. Some examples of the requested content can include a torrent; an image file, such as a container image for launching a container in a host environment or an operating-system image for installing an operating system; a filesystem file, such as a static delta that represents a difference between two commit objects in a filesystem tree; a multimedia file, such as a video file or an audio file; an application, such as a game or a utility application; a software update, such as an operating system update; a binary large object (BLOB) file; or any combination of these.

The node 102 also includes intermediary software 112 that can intercept, redirect, or manipulate communications between the content requesting software 110 and the remote server 108. In some examples, the intermediary software 112 can be proxy software for generating a local proxy server on the node 102. And the content requesting software 110 can have a proxy-configuration option set to use the local proxy server. For example, the proxy-configuration option can be set to use an Internet Protocol (IP) address and port associated with the local proxy server. This may cause the content requesting software 110 to communicate with the remote server 108 via the local proxy server, and vice versa. In other examples, the intermediary software 112 can monitor some or all of the outgoing communications from the node 102 and analyze or intercept communications destined for the remote server 108.

The intermediary software 112 can include any number of configurable settings. For example, the intermediary software 112 can include a port setting for selecting a port for a local proxy server files (a default value can be port 8888); an IP address setting for selecting an IP address for the local proxy server files (a default value can be 0.0.0.0); a secure socket layer (SSL) setting for enabling communications between the content requesting software 110 and the proxy server to be transmitted via SSL; a registry location setting for selecting an upstream registry location; a tracker address setting for selecting an IP address for the tracker 118; a remote server address setting for selecting an IP address for the remote server 108; a remote server port setting for selecting a port for communicating with the remote server 108; a torrent first-port setting for selecting a first port for listening for torrent files (a default value can be port 6881); a torrent last-port setting for selecting a last port for listening for torrent files (a default value can be port 6891); a certificate setting for selecting a path for a certificate file for a Hypertext Transfer Protocol Secure (HTTPS) server; a private key setting for selecting a private key; or any combination of these.

In some examples, the content requesting software 110 can determine that content is to be downloaded from the remote server 108. For example, the content requesting software 110 may determine that a new version of a container image is available and to be downloaded from the remote server 108. To obtain the content, the content requesting software 110 can transmit a download request 114 destined for the remote server 108. The intermediary software 112 can intercept the download request and determine if the content is available for download on a peer-to-peer network 106, such as a BitTorrent™, Gnutella™, Freenet, or eDonkey network. In some examples, the intermediary software 112 can communicate with a tracker 118 of the peer-to-peer network 106 to determine if the content is available for download via the peer-to-peer network 106. The tracker 118 can keep track of which content is available for download via the peer-to-peer network 106, where copies of content reside on peers in the peer-to-peer network 106, or both of these. For example, the tracker 118 can maintain a list of content (e.g., torrents) available for download at any given instant in time via the peer-to-peer network 106. The tracker 118 can receive an inquiry from the intermediary software 112 about the availability of the content and provide a response indicating whether or not the content is available on the peer-to-peer network 106. The intermediary software 112 can determine if the content is available from the peer-to-peer network 106 based on the response. In other examples, the intermediary software 112 can use a distributed hash table (DHT) additionally or alternatively to the tracker 118 to identify whether content is available on the peer-to-peer network 106. A distributed hash table can include a hash table of key-value pairs that is distributed among nodes in a network, such as peers in peer-to-peer network 106. The key-value pairs can include a listing of content that is available for download. The intermediary software 112 can access the distributed hash table to determine if the content is available for download via the peer-to-peer network 106.

If the intermediary software 112 determines that the content is not available for download on the peer-to-peer network 106, the intermediary software 112 can transmit the download request to the remote server 108. The remote server 108 can receive the download request and transmit the content to the node 102. If the intermediary software 112 determines that the content is available for download on the peer-to-peer network 106, the intermediary software 112 can generate an alternate download request 116 that is in a format or protocol compatible with the peer-to-peer network 106. The intermediary software 112 can then transmit the alternate download request 116 to the peer-to-peer network 106 to cause the content to be downloaded to the node 102 from the peer-to-peer network 106.

The intermediary software 112 can generate the alternate download request 116 based on the download request 114. In some examples, the intermediary software 112 can generate the alternate download request 116 by translating the download request 114 from its original protocol to a different protocol that is compatible with the peer-to-peer network 106. For example, the intermediary software 112 can modify one or more headers of the download request 114 to conform to the different protocol. Alternatively, the intermediary software 112 can generate the alternate download request 116 by creating a new download request that is separate from the original download request 114. The new download request can be created in a format that is compatible with the peer-to-peer network 106. The new download request can incorporate information (e.g., a name for a file) from the original download request 114. In some examples, generating the alternate download request 116 enables the intermediary software 112 to account for protocol differences between the content requesting software 110 and the peer-to-peer network 106.

In some examples, the intermediary software 112 is transparent to the content requesting software 110. For example, the intermediary software 112 can execute in a different process or thread of the node 102 to prevent the intermediary software 112 from interfering with the functionality of the content requesting software 110. As another example, the intermediary software 112 may execute in a separate virtual machine or container from the content requesting software 110 to prevent the intermediary software 112 from interfering with the functionality of the content requesting software 110. As yet another example, the intermediary software 112 may be executed by a different processor than the content requesting software 110. Further, the content requesting software 110 can be unaware that (i) its communications have been intercepted by the intermediary software 112; (ii) the content it is receiving is from a different source than the remote server 108; or (iii) both of these.

The system 100 shown in FIG. 1 is provided for illustrative purposes, and in other examples the system 100 can include more components, fewer components, different components, or a different configuration of the components shown in FIG. 1. For example, all of the download requests 114 from the content requesting software 110 may be intercepted by the intermediary software 112 and rerouted to the peer-to-peer network 106, eliminating the need for the remote server 108. So, the network 104 or system 100 may exclude the remote server 108. As another example, the network 104 can include the peer-to-peer network 106, or vice versa. In such an example, the node 102 can serve as a peer, a tracker 118, or both in the peer-to-peer network 106. For example, the node 102 can include peer-to-peer software (e.g., BitTorrent software by BitTorrent™) for accessing and using the peer-to-peer network 106.

In some examples in which the node 102 is a peer in the peer-to-peer network 106, the node 102 can download content from the remote server 108 and make the content available to other nodes on the peer-to-peer network 106. For example, the content requesting software 110 can transmit a download request 114 for content. The intermediary software 112 can intercept the download request and communicate with the peer-to-peer network 106 to determine if the content is available on the peer-to-peer network 106. For example, the intermediary software 112 can interface with the peer-to-peer software to transmit commands to the peer-to-peer network 106 for determining if the content is available on the peer-to-peer network 106. If the content is available on the peer-to-peer network 106, the node 102 can obtain the content from the peer-to-peer network 106. If the content is not available on the peer-to-peer network 106, the node 102 can obtain the content from the remote server 108 and make the content available to the rest of the peer-to-peer network 106. In some examples, the intermediary software 112 can store the content in a folder that is shared with the peer-to-peer network 106 using the peer-to-peer software. In other examples, the intermediary software 112 can update the tracker 118 that the content is now available on the node 102. For example, the intermediary software 112 can transform the content into a .torrent file and register the .torrent file with the tracker 118. By making the content available on the peer-to-peer network 106, other nodes can download the content from the peer-to-peer network 106 in the future.

Figure 2:
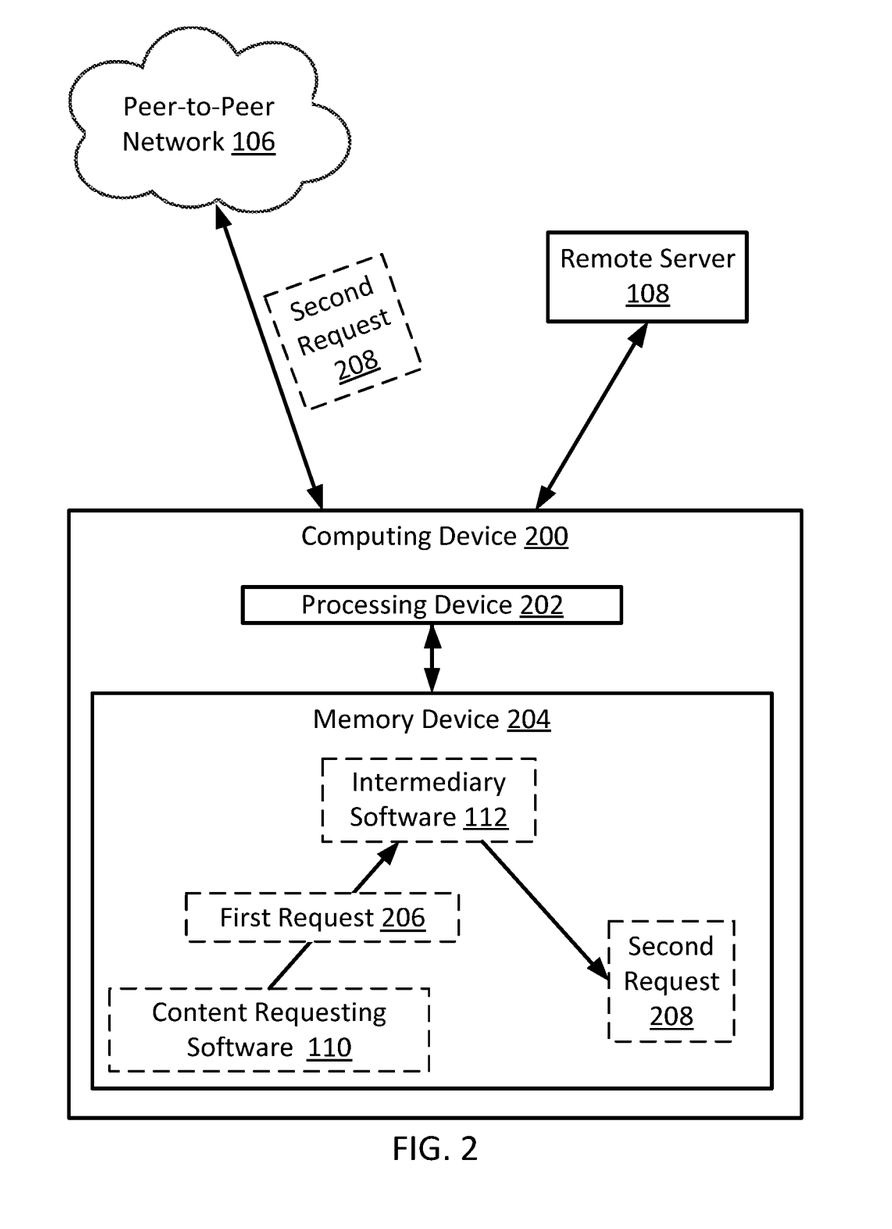
FIG. 2 is a block diagram of an example of a computing device for managing content downloads according to some aspects.

One example of the node 102 is shown as computing device 200 in FIG. 2. The computing device 200 can be in communication with the peer-to-peer network 106, the remote server 108, or both. The computing device 200 has a processing device 202 communicatively coupled to a memory device 204. The processing device 202 can include one processing device or multiple processing devices. Non-limiting examples of the processing device 202 include a Field-Programmable Gate Array (FPGA), an application-specific integrated circuit (ASIC), a microprocessor, etc.

The processing device 202 can execute one or more operations for managing content downloads. The processing device 202 can execute instructions stored in the memory device 204 to perform the operations. In some examples, the instructions can include processor-specific instructions generated by a compiler or an interpreter from code written in any suitable computer-programming language, such as C, C++, C#, etc.

Memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. In some examples, at least some of the memory device can include a medium from which the processing device 202 can read instructions. A computer-readable medium can include electronic, optical, magnetic, or other storage devices capable of providing the processing device with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions.

The memory device 204 can include the intermediary software 112 and the content requesting software 110. The content requesting software 110 can generate a first request 206 to be communicated to the remote server 108. Examples of the first request 206 can include the download request 114 or any other request for information from the remote server 108. The first request 206 can be stored in memory device 204. The intermediary software 112 can intercept the first request 206 and generate a second request 208 based on the first request 206. Examples of the second request 208 can include the alternate download request 116 or a modified version of the first request 206. The second request 208 can additionally or alternatively be stored in memory device 204. The computing device 200 can then transmit the second request 208 to the peer-to-peer network 106.

Figure 3:
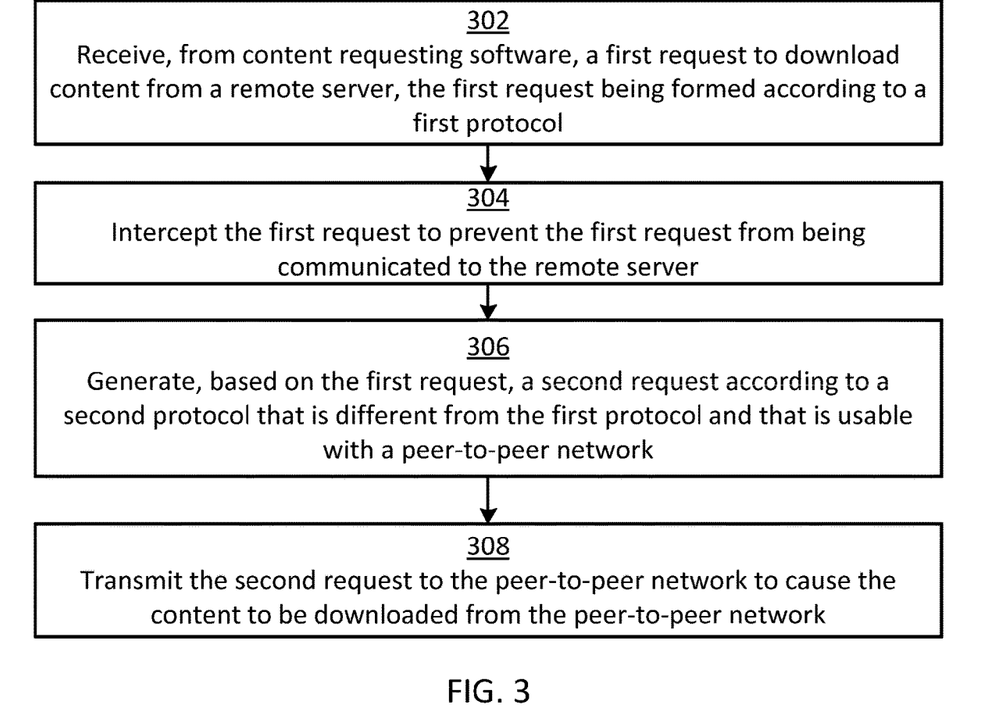
FIG. 3 is a flow chart of an example of a process for managing content downloads according to some aspects.
Figure 4:
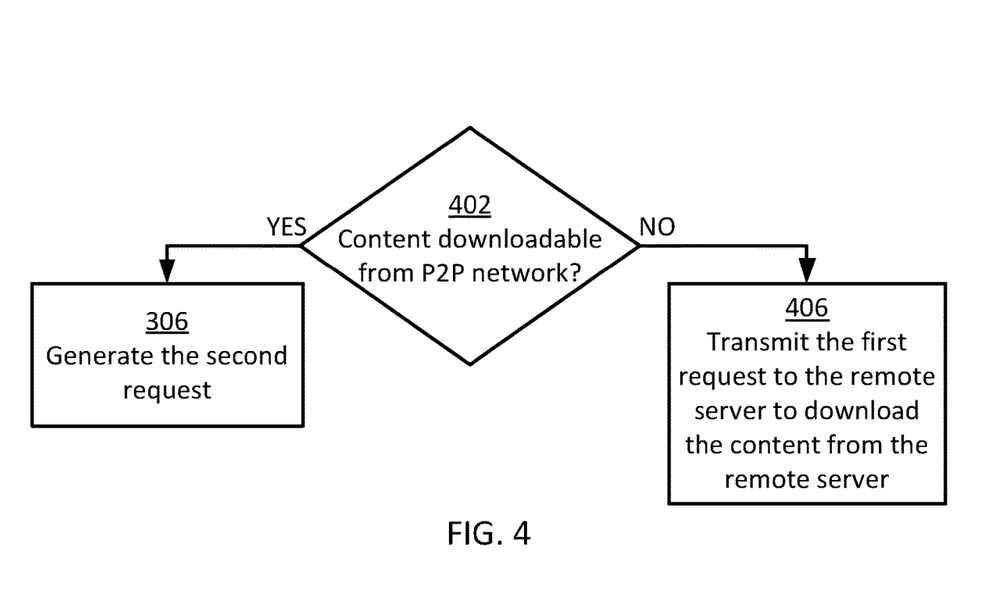
FIG. 4 is a flow chart of an example of a process for managing content downloads according to some aspects.

In some examples, the computing device 200 can implement some or all of the steps shown in FIGS. 3-4. Some examples can include more, fewer, or different steps than the steps depicted in FIGS. 3-4. The steps of FIGS. 3-4 are described with reference to components described above.

In block 302, the processing device 202 receives, from content requesting software 110, a first request 206 to download content from a remote server 108. The first request 206 can be formed according to a first protocol. Examples of the first protocol can include a Hypertext Transfer Protocol (HTTP), a HTTPS protocol, a Transport Layer Security (TLS) protocol, a Socket Secure (SOCKS) protocol, a File Transfer Protocol (FTP), a FTPS protocol, a Secure Socket Layer (SSL) protocol, or any combination of these.

In some examples, the processing device 202 can receive the first request 206 via a local proxy server. For example, the processing device 202 can use the intermediary software 112 to establish the local proxy server on the computing device 200. The processing device 202 can generate the local proxy server by opening a port of the computing device 200, associating an IP address with the port, and listening on the port. Examples of the port can include port 80, port 8080, port 3128, and port 8081. Examples of the IP address can include 127.0.0.1 or 0.0.0.0. The processing device 202 can receive the first request 206 from the content requesting software 110 via the local proxy server. For example, the content requesting software 110 can be set to transmit the first request 206 to port 80 of the IP address 127.0.0.1, which can be associated with the local proxy server. This may enable the local proxy server to detect and accept the first request 206.

In some examples, the processing device 202 can receive the first request 206 by analyzing some or all of the communications leaving the computing device 200. For example, the processing device 202 can use the intermediary software 112 to analyze some or all of the communications leaving the computing device 200 and identify a subset of the communications that (i) are destined for the remote server 108; (ii) are of a certain type, such as a download request to download content from the remote server 108; or (iii) both. One or more of the subset of communications can be the first request 206.

In block 304, the processing device 202 intercepts the first request 206 to prevent the first request 206 from being communicated to the remote server 108. For example, the processing device 202 can block transmission of the first request 206 to the remote server 108.

In some examples, the processing device 202 can perform some or all of the process of FIG. 4 during or after performing the step of block 304. Referring now to FIG. 4, in block 402, the processing device 202 determines if the content is downloadable from the peer-to-peer network 106. For example, the processing device 202 can communicate with the tracker 118 of the peer-to-peer network 106 to determine if the content is available for download via the peer-to-peer network 106. The tracker 118 can respond to the processing device 202 indicating whether or not the content is available on the peer-to-peer network 106. If the processing device 202 determines that the content is not downloadable from the peer-to-peer network 106, the process can proceed to block 406, where the processing device 202 can transmit the first request 206 to the remote server 108 to download the content from the remote server 108. Thereafter, the process(es) of FIGS. 3-4 may end. If the processing device 202 determines that the content is downloadable from the peer-to-peer network 106, the process can proceed to block 306, where the processing device 202 can generate the second request 208.

In block 306, the processing device 202 generates, based on the first request 206, a second request 208 according to a second protocol. The second protocol can be different from the first protocol. The second protocol can be usable with a peer-to-peer network 106. In some examples, the processing device 202 can generate the second request 208 by translating the first request 206 from the first protocol into a second protocol that is compatible with the peer-to-peer network 106. For example, the processing device 202 can modify or delete existing headers of the first request 206 to make the first request 206 conform to the second protocol. As another example, the processing device 202 can add headers to the first request 206 to make the first request 206 conform to the second protocol.

In other examples, the processing device 202 can generate the second request 208 by creating a new request that is separate from the first request 206. The new request can be created in a format that is compatible with the peer-to-peer network 106. The new request can incorporate information from the first request 206. For example, a name for content to be downloaded can be extracted from the first request 206 and included in the second request 208.

In block 308, the processing device 202 transmits the second request 208 to the peer-to-peer network 106 to cause the content to be downloaded from the peer-to-peer network 106.

In some examples, the processing device 202 can perform one or more additional or different steps to the steps shown in FIG. 3. For example, the processing device 202 can authenticate with the peer-to-peer network 106, the remote server 108, or both before or during the process shown in FIG. 3. In one example, prior to transmitting the second request 208 to the peer-to-peer network 106, the processing device 202 can transmit (i) authentication details to the peer-to-peer network 106 to authenticate with the peer-to-peer network 106; (ii) authentication details to the remote server 108 to authenticate with the remote server 108; or (iii) both. Examples of the authentication details can include a username, a password, and a private key. In one example, the intermediary software 112 can include configurable authentication settings through which a user can input authentication details for the peer-to-peer network 106, the remote server 108, or both. The processing device 202 can then use the authentication details to authenticate with to the peer-to-peer network 106 or the remote server 108.

Figure 5:
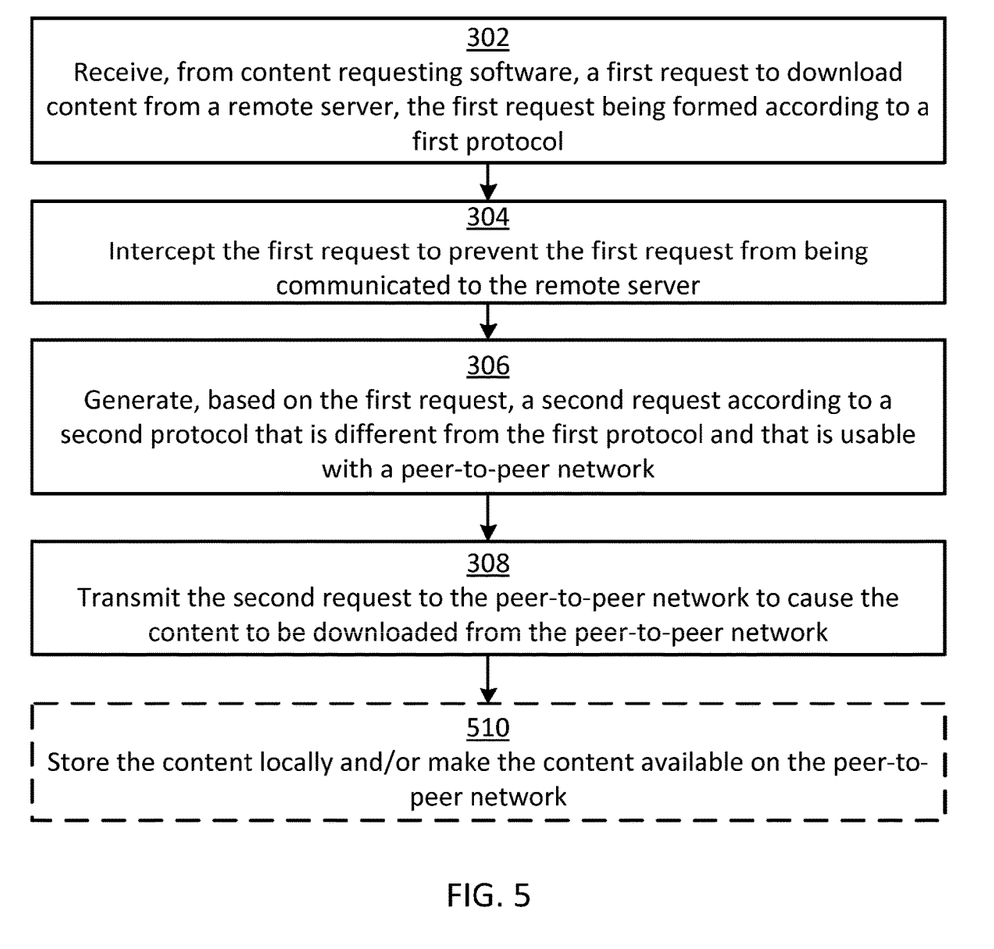
FIG. 5 is a flow chart of an example of a process for managing content downloads according to some aspects.

In some examples, the processing device 202 can optionally perform step 510 shown in FIG. 5. For example, after downloading the content from the peer-to-peer network, the processing device 202 can store the content locally (e.g., in a local memory device 204), make the content available for download on the peer-to-peer network 106, or both of these.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A computer-implemented method comprising:
    receiving, from a first device, a first request to download first content from a remote server;
    determining that the first content is downloadable from a peer-to-peer network via a tracker or distributed hash table associated with the peer-to-peer network, the tracker being for maintaining a database of content available for download via the peer-to-peer network;
    based on determining that the first content is downloadable from the peer-to-peer network, transmitting a second request to the peer-to-peer network to cause the first content to be downloaded from the peer-to-peer network;
    receiving a third request for downloading second content from the remote server;
    determining that the second content is not downloadable from the peer-to-peer network; and
    based on determining that the second content is not downloadable from the peer-to-peer network, transmitting a fourth request to the remote server to cause the second content to be downloaded from the remote server.

2. The method of claim 1, further comprising:
    preventing the first request from being communicated to the remote server.

3. The method of claim 1, wherein the first content includes a container image, and the first request is generated on the first device by software configured to create or launch containers within a host environment.

4. The method of claim 1, further comprising:
prior to transmitting the second request to the peer-to-peer network, authenticating with the peer-to-peer network by communicating a username and password to the peer-to-peer network.

5. The method of claim 1, further comprising:
listening for content requests from the first device via a local proxy server, the local proxy server being configured to serve as an intermediary between the first device and the remote server; and
receiving the first request from the first device via the local proxy server.

6. The method of claim 1, wherein the peer-to-peer network excludes the remote server.

7. The method of claim 1, further comprising:
subsequent to downloading the second content, making the second content available for download on the peer-to-peer network.

8. A non-transitory computer-readable medium comprising program code that is executable by a processor for causing the processor to:
receive, from a first device, a first request to download first content from a remote server;
determine that the first content is downloadable from a peer-to-peer network via a tracker or distributed hash table associated with the peer-to-peer network, the tracker being for maintaining a database of content available for download via the peer-to-peer network;
based on determining that the first content is downloadable from the peer-to-peer network, transmit a second request to the peer-to-peer network to cause the first content to be downloaded from the peer-to-peer network;
receive a third request for downloading second content from the remote server;
determine that the second content is not downloadable from the peer-to-peer network; and
based on determining that the second content is not downloadable from the peer-to-peer network, transmit a fourth request to the remote server to cause the second content to be downloaded from the remote server.

9. The non-transitory computer-readable medium of claim 8, further comprising program code that is executable by the processor for causing the processor to:
prevent the first request from being communicated to the remote server.

10. The non-transitory computer-readable medium of claim 8, wherein the first content includes a container image, and the first request is generated on the first device by software configured to create or launch containers within a host environment.

11. The non-transitory computer-readable medium of claim 8, further comprising program code that is executable by the processor for causing the processor to:
prior to transmitting the second request to the peer-to-peer network, authenticate with the peer-to-peer network by communicating a username and password to the peer-to-peer network.

12. The non-transitory computer-readable medium of claim 8, further comprising program code that is executable by the processor for causing the processor to:
listen for content requests from the first device via a local proxy server, the local proxy server being configured to serve as an intermediary between the first device and the remote server; and
receive the first request from the first device via the local proxy server.

13. The non-transitory computer-readable medium of claim 8, wherein the peer-to-peer network excludes the remote server.

14. The non-transitory computer-readable medium of claim 8, wherein the first content includes a software update.

15. A computer-implemented method comprising:
preventing a first request that was transmitted by a first device from being communicated to a remote server, the first request being to download content from the remote server;
determining that the content is downloadable from a peer-to-peer network; and
based on determining that the content is downloadable from the peer-to-peer network, transmitting a second request to the peer-to-peer network to cause the content to be downloaded from the peer-to-peer network;
wherein the content includes a container image, and the first request is generated on the first device by software configured to create or launch containers within a host environment.

16. The method of claim 15, further comprising:
prior to transmitting the second request to the peer-to-peer network, authenticating with the peer-to-peer network by communicating a username and password to the peer-to-peer network.

17. The method of claim 15, further comprising:
listening for content requests from the first device via a local proxy server, the local proxy server being configured to serve as an intermediary between the first device and the remote server; and
receiving the first request from the first device via the local proxy server.

18. The method of claim 15, wherein the peer-to-peer network excludes the remote server.

19. The method of claim 15, wherein the content includes a software update.

20. The method of claim 15, further comprising determining that the content is downloadable from the peer-to-peer network via a tracker or distributed hash table associated with the peer-to-peer network, the tracker being for maintaining a database of content available for download via the peer-to-peer network.

* * * * *